US009570964B2

(12) United States Patent
Yoshida et al.

(10) Patent No.: US 9,570,964 B2
(45) Date of Patent: Feb. 14, 2017

(54) ROTOR CORE OF DYNAMOELECTRIC MACHINE AND METHOD OF MANUFACTURING THE SAME

(75) Inventors: Toshiyuki Yoshida, Mie (JP); Takeo Kaito, Mie (JP); Tomotoshi Kasuya, Mie (JP)

(73) Assignee: Toshiba Industrial Products Manufacturing Corporation, Mie (JP)

( * ) Notice: Subject to any disclaimer, the term of this patent is extended or adjusted under 35 U.S.C. 154(b) by 508 days.

(21) Appl. No.: 13/328,325

(22) Filed: Dec. 16, 2011

(65) Prior Publication Data

US 2012/0153769 A1    Jun. 21, 2012

(30) Foreign Application Priority Data

Dec. 21, 2010   (JP) .................................. 2010-284468

(51) Int. Cl.
*H02K 1/06*     (2006.01)
*H02K 1/27*     (2006.01)
*H02K 15/00*    (2006.01)

(52) U.S. Cl.
CPC ...... *H02K 15/0012* (2013.01); *Y10T 29/49009* (2015.01)

(58) Field of Classification Search
CPC ............ H02K 1/27; H02K 1/28; H02K 15/00; H02K 15/02
USPC ................... 310/216.009, 216.011, 216.049, 216.048,310/216.109, 216.113, 216.116–117,310/216.124–126, 216.127, 216.132–134
See application file for complete search history.

(56) References Cited

U.S. PATENT DOCUMENTS

| 5,349,740 | A  | * | 9/1994  | Neuenschwander | ........... 29/596 |
| 5,649,349 | A  | * | 7/1997  | Greenway | ....................... 29/598 |
| 2008/0224558 | A1 | * | 9/2008 | Ionel | ......................... 310/156.57 |
| 2008/0272667 | A1 | * | 11/2008 | Ionel et al. | .............. 310/156.83 |
| 2010/0301698 | A1 | * | 12/2010 | Goto et al. | .................... 310/211 |

FOREIGN PATENT DOCUMENTS

| DE | 4432356 A1 | * | 3/1996 |
| JP | US511441 |   | 1/1976 |
| JP | 04112652 A | * | 4/1992 |
| JP | 04344153 A | * | 11/1992 |
| JP | 09121516 A | * | 5/1997 |
| JP | 2003219616 A | * | 7/2003 |

OTHER PUBLICATIONS

Machine Translation DE4432356 (1996).*

* cited by examiner

*Primary Examiner* — Jose Gonzalez Quinones
(74) *Attorney, Agent, or Firm* — Baker Botts L.L.P.

(57) ABSTRACT

A rotor core includes a rotor core includes a plurality of rotor core blocks each of which is constituted by stacking annular sheet-like core materials in a direction of sheet thickness of each core material and a plurality of catch recesses circumferentially disposed in an inner circumference of each core material at an interval of a predetermined angle so as to extend radially outward, the catch recesses having respective circumferential dimensions equal to each other and different radial depths. In each rotor core block, a plurality of the core materials is stacked while the catch recesses having an identical configuration are aligned. The rotor core blocks have respective outer peripheries which are shifted from each other according to the depths of the catch recesses caught by a bar-shaped aligning jig when the catch recesses of the rotor core blocks are caught by the aligning jig.

1 Claim, 7 Drawing Sheets

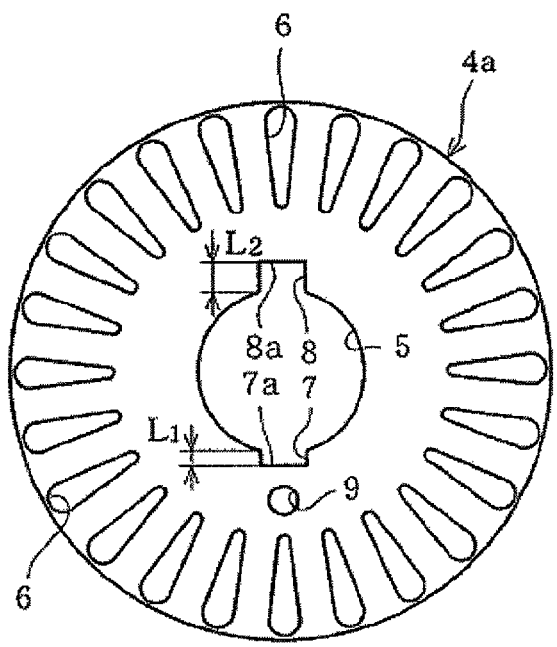 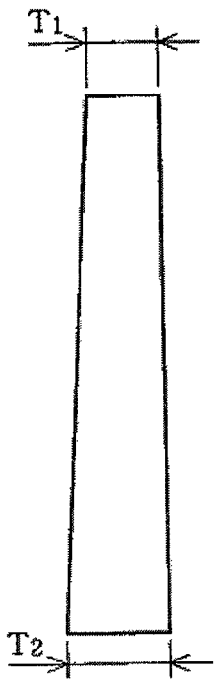
FIG. 3A  FIG. 3B
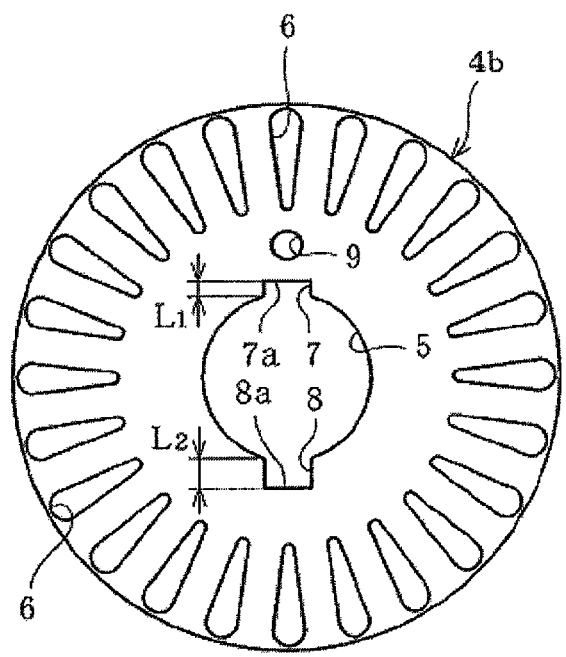 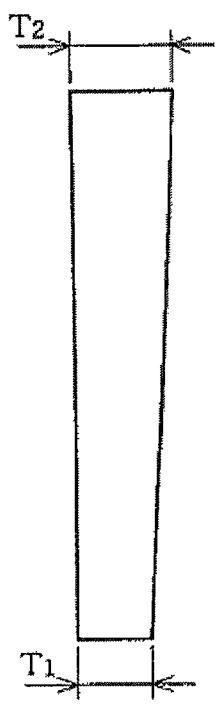
FIG. 4A  FIG. 4B

ROTOR CORE OF DYNAMOELECTRIC MACHINE AND METHOD OF MANUFACTURING THE SAME

CROSS-REFERENCE TO RELATED APPLICATIONS

This application is based upon and claims the benefit of priority from Japanese Patent Application No. 2010-284468 filed Dec. 21, 2010, the entire contents of which are incorporated herein by reference.

FIELD

Embodiments described herein relate to a rotor core and a method of manufacturing the rotor core.

BACKGROUND

A dynamoelectric machine includes a rotor having a rotor core made by stacking core materials, for example, by die-casting of aluminum. The core material is made by punching band-shaped magnetic steel sheets, for example. However, the band-shaped magnetic steel sheets are made by rolling, which results in variations in a thickness of the magnetic steel sheets. When the magnetic steel sheets have variations in the thickness, the core materials obtained from the magnetic steel sheets also have variations in the thickness. Accordingly, when the core materials are stacked without consideration of directions of the core materials in order that a rotor core may be obtained, obtained rotor cores sometimes vary in dimensions. In view of the problem, it is proposed to axially divide the rotor core into two parts and to stack the divided parts circumferentially shifted from each other by a predetermined angle, for example, 180°.

However, there has conventionally been no way to check, after the stacking, that the core materials are stacked while being circumferentially shifted by the predetermined angle. As a result, when manually stacked, the core materials are sometimes stacked without being shifted circumferentially by the predetermined angle.

BRIEF DESCRIPTION OF THE DRAWINGS

FIGS. 3A and 3B are a plan view and a side view of a first core material respectively;

FIGS. 4A and 4B are views similar to respective FIGS. 3A and 3B, both showing a second core material;

DETAILED DESCRIPTION

In general, according to one embodiment, a rotor core includes a plurality of rotor core blocks each of which is constituted by stacking annular sheet-like core materials in a direction of sheet thickness of each core material and a plurality of catch recesses circumferentially disposed in an inner circumference of each core material at an interval of a predetermined angle so as to extend radially outward, the catch recesses having respective circumferential dimensions equal to each other and different radial depths. In each rotor core block, a plurality of the core materials is stacked while the catch recesses having an identical configuration are aligned. The rotor core blocks have respective outer peripheries which are shifted from each other according to the depths of the catch recesses caught by a bar-shaped aligning jig when the catch recesses of the rotor core blocks are caught by the aligning jig.

The following embodiments are directed to a rotor core which is used in a rotor of a three-phase induction motor of the inner rotor type. The rotor is made by aluminum die-cast. Each embodiment will now be described with reference to the drawings. An axial direction of the rotor core is the same as a direction in which core materials are stacked and vice versa. The axial direction of the rotor core is also the same as a direction of sheet thickness of the core material and vice versa.

Figure 1:
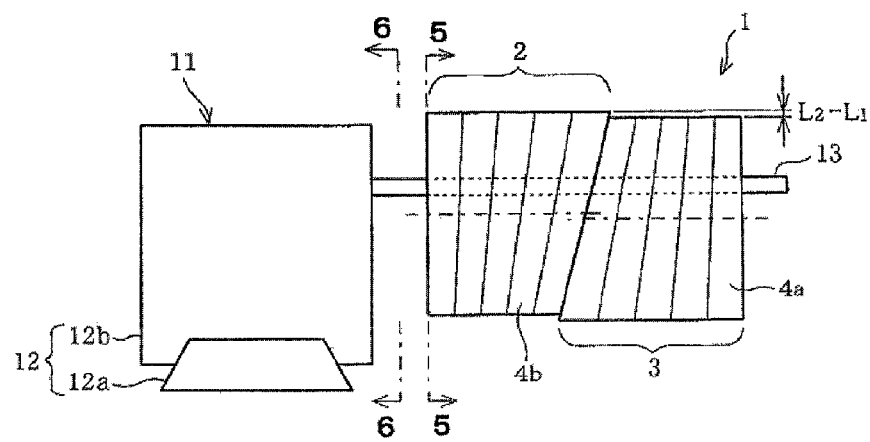
FIG. 1 is a schematic side view of a rotor core caught by an aligning jig of an aligning device, showing a first embodiment.
Figure 2:
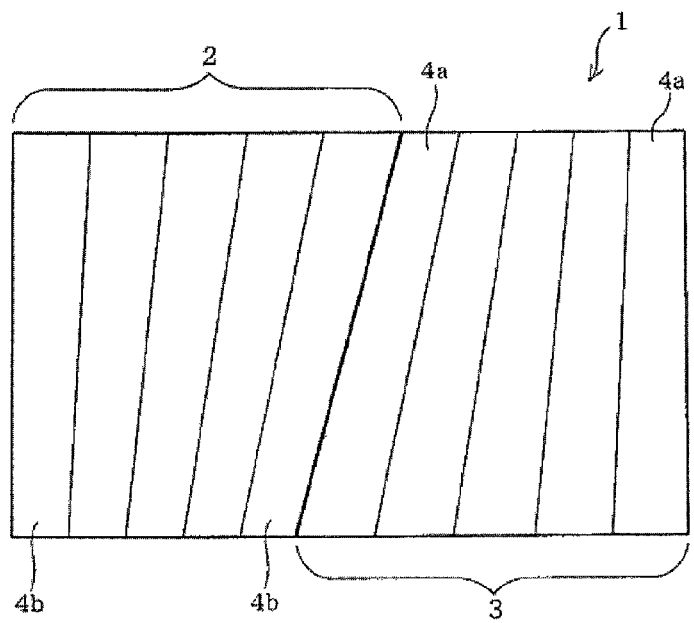
FIG. 2 is a schematic side view of the rotor core.

A first embodiment will be described with reference to FIGS. 1 to 6. A rotor core 1 as shown in FIG. 2 includes m number of, for example, two rotor core blocks 2 and 3. M may be set to any integer of 2 or larger than 2. The rotor core blocks 2 and 3 have the same configuration. The rotor core blocks 2 and 3 are constituted by stacking five core materials 4a and 4b in a direction of sheet thickness of the core materials 4a and 4b respectively.

The core materials 4a and 4b are formed into annular and sheet-like shapes respectively as shown in FIGS. 3A to 4B. The core materials 4a and 4b are each formed by punching a band of magnetic steel sheet by a press machine or the like so that an annular sheet is obtained. The core material 4b as shown in FIGS. 4A and 4B has the same configuration as the core material 4a as shown in FIGS. 3A and 3B and is obtained by circumferentially rotating the core material 4a as shown in FIGS. 3A and 3B or by reversing the core material 4a as shown in FIGS. 3A and 3B vertically by 180°. The rotor core block 2 is constituted by stacking five core materials 4b sequentially forward as viewed in FIG. 4A, for example. Furthermore, the rotor core block 3 is constituted by stacking five core materials 4a sequentially forward as viewed in FIG. 4B, for example.

The magnetic steel sheet is generally formed into a band shape by rolling. Variations in the load of a roller used in the rolling result in deviation in the sheet thickness of the magnetic sheet. Accordingly, when the band-shaped magnetic steel sheet is made by punching, the thickness of the core material 4a differs from one part to another as shown in FIG. 3B, and the thickness of the core material 4b also differs from one to another as shown in FIG. 4B. In each of FIGS. 3B and 4B, symbol $T_1$ designates a smallest sheet thickness and symbol $T_2$ designates a largest sheet thickness. Furthermore, the sheet thickness in the upper side is smaller than the sheet thickness in the lower side of the core material 4a as shown in FIGS. 3A and 3B. The sheet thickness in the upper side is larger than the sheet thickness in the lower side of the core material 4b as shown in FIGS. 4A and 4B. In the following description, the core material 4a as shown in FIGS. 3A and 3B will be referred to as "a first core material 4a" and the core material 4b as shown in FIGS. 4A and 4B will be referred to as "a second core material 4b."

Since the core material 4b has a smaller sheet thickness in a lower part thereof than in an upper part thereof as shown in FIG. 4B, the rotor core block 2 has a smaller dimension in the stacking direction in a lower part thereof than in an upper part thereof as shown in FIG. 2. The difference is obtained by subtracting the dimension in the stacking direction in the lower part ($5 \times T_1$) from the dimension in the stacking direction in the upper part ($5 \times T_2$). In this case, the difference is shown as ($5 \times T_2 - 5 \times T_1$). Furthermore, since the core material 4a has a smaller sheet thickness in an upper part thereof than in a lower part thereof as shown in FIG. 3B, the rotor core block 3 has a smaller dimension in the stacking direction in an upper part thereof than in a lower part thereof as shown in FIG. 2. The difference is obtained by subtracting the dimension in the stacking direction in the upper part ($5 \times T_1$) from the dimension in the stacking direction in the lower part ($5 \times T_2$). In this case, the difference is shown as ($5 \times T_2 - 5 \times T_1$).

The first and second core materials 4a and 4b are formed with respective through holes 5 which correspond to an inner circumferential hole, as shown in FIGS. 3A and 4A. A columnar rotating shaft (not shown) is to be inserted into the holes 5. On the other hand, each one of the core materials 4a and 4b has a plurality of, for example, twenty-four slots 6 which are formed in an outer circumferential portion thereof so as to be arranged circumferentially at regular intervals. The slots 6 are to be filled with aluminum in an aluminum die-casting. Each slot 6 is formed into an elongate shape, extending from the substantially axially central part thereof axially outward to a part thereof near the outer circumference thereof. Each slot 6 has a circumferential dimension or width that is gradually rendered larger as it extends radially outward.

Each of the core materials 4a and 4b has m-number of, for example, two catch recesses 7 and 8 formed in the inner circumference thereof defining the hole 5. The catch recesses 7 and 8 are disposed circumferentially at intervals of $(360 \div m)°$. Since m=2 in this case, the catch recesses 7 and 8 are disposed circumferentially at intervals of 180°. More specifically, the catch recesses 7 and 8 are formed so as to be located at respective positions circumferentially apart from each other by 180° about the central axis of each of the first and second core materials 4a and 4b, and in other words, the catch recesses 7 and 8 are formed in the inner circumferential surface defining the hole 5 so as to be located at circumferentially opposed positions. In the following description, it is assumed that the catch recess 7 is formed in a thicker part of each of the core materials 4a and 4b and the catch recess 8 is formed in a thinner part of each of the core materials 4a and 4b.

Each of the catch recesses 7 and 8 is a notch extending radially outward from the circumferential surface defining the hole 5. The catch recesses 7 and 8 have the same circumferential dimension or the same width as shown in FIGS. 3A and 4A. Furthermore, the catch recess 7 is formed into a rectangular shape and is open at the inner circumferential side defining the hole 5. Thus, the catch recesses 7 and 8 are disposed circumferentially at intervals of 180°. Each of the catch recesses 7 and 8 has a circumferential dimension that is substantially the same as the maximum circumferential dimension of the slots 6, for example.

The catch recess 7 differs from the catch recess 8 in a radially outward dimension or the depth. More specifically, the catch recess 7 has a depth $L_1$ that is smaller than a depth $L_2$ of the catch recess 8 as shown in FIGS. 3A and 4A. The depth $L_1$ of the catch recess 7 corresponds to a shortest length from the circumference of the hole 5 that is the inner circumference of the core material 4 or the circumference of an imaginary circle to a side surface 7a located radially outward with respect to the catch recess 7. The imaginary circle is concentric with and has the same configuration as the hole 5. The depth $L_2$ of the catch recess 8 corresponds to a shortest length from the inner circumference of the hole 5 to a side surface 8a located radially outward with respect to the catch recess 8. The imaginary circle is concentric with and has the same configuration as the hole 5.

The catch recesses 7 and 8 are formed by cutting each of the first and second core materials 4a and 4b as described above. However, the catch recesses 7 and 8 have the respective depths differing from each other and accordingly differ from each other in the cubic volume. Accordingly, there is a possibility that the weight of each of the first and second core materials 4a and 4b may become unbalanced with the forming of the catch recesses 7 and 8 and accordingly that the weight of the rotor core 1 may become unbalanced. In view of this problem, it is desirable that the first and second core materials 4a and 4b should have balance holes 9 which are formed therethrough near the catch recess 7 or 8 with the smaller depth, that is, the catch recess 7 in the embodiment. Each of the first and second core materials 4a and 4b has a single balance hole 9 in the embodiment. A size and a position of the balance hole 9 is determined so that each of the first and second core materials 4a and 4b has the same gravity center before and after the forming of the catch recesses 7 and 8. More specifically, each balance hole 9 is formed at a position such that the sum of moments of all the catch recesses 7 and 8 becomes 0. In other words, each balance hole 9 is formed at a position such that:

(Mass of the core material corresponding to the cubic volume of the catch recess 7)×(distance from the central axis of the core material to the gravity center of the catch recess 7)+(mass of the core material corresponding to the cubic volume of balance hole 9)×(distance from the central axis of the core material to the gravity center of the balance hole 9)=(mass of the core material corresponding to the cubic volume of the catch recess 8)×(distance from the central axis of the core material to the gravity center of the catch recess 8), given that no catch recesses 7 and 8 and no balance hole 9 are formed.

Each of the rotor core blocks 2 and 3 is constituted by stacking the first and second core materials 4a and 4b so that the catch recesses 7 and 8 having the same configuration in the thickness direction of each of the core materials 4a and 4b, that is, the catch recesses 7 correspond with each other. Additionally, the catch recess 8 is located at the position 180° apart from the catch recess 7 about the central axis of each of the first and second core materials 4a and 4b. Accordingly, the catch recesses 8 also correspond with one another in the stacked first and second core materials 4a and 4b. In the embodiment, the rotor core block 2 is constituted by stacking the second core materials 4b so that the second core materials 4b are superposed so as to be directed such that sheet thickness deviations are equal to one another, as described above. As a result, the rotor core block 2 differs in the dimension in the stacking direction from its one part to another. Furthermore, the rotor core block 3 is also constituted by stacking the first core materials 4*a* so that the first core materials 4*a* are superposed so as to be directed such that thickness deviations are equal to one another, as described above. As a result, the rotor core block 3 also differs in the dimension in the stacking direction from its one part to another.

The rotor core 1 is constituted by stacking the rotor core block 2 (serving as one rotor core block) and the rotor core block (serving as the other rotor core block) so that the catch recesses 7 of the same configuration are relatively shifted circumferentially by (360÷m)° or by 180° from the position where the catch recesses 7 are superposed. In other words, the rotor core 1 is constituted by stacking the rotor core blocks 2 and 3 so that the inner circumferential openings of the catch recesses 7 and 8 circumferentially correspond with each other. Consequently, the rotor core block 2 includes a part having a smaller dimension in the stacking direction and the rotor core block 3 includes a part having a larger dimension in the stacking direction. These two parts are continuous in the stacking direction. Furthermore, the rotor core block 2 further includes a part having a larger dimension in the stacking direction and the rotor core block 3 includes a part having a smaller dimension in the stacking direction. These two parts are also continuous in the stacking direction. Thus, the rotor core 1 has almost no variations in the axial or stacking direction as shown in FIG. 2. Accordingly, the rotor core 1 is shown as a rectangular shape as viewed at a side thereof.

Figure 5:
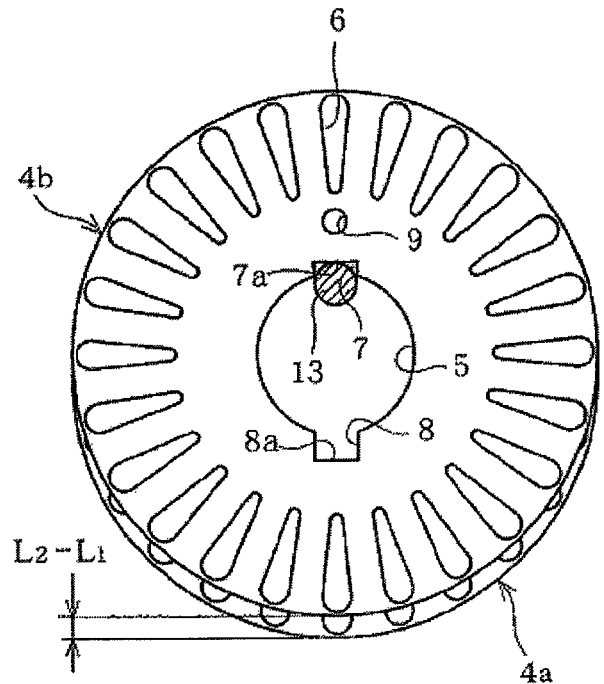
FIG. 5 is a sectional view taken along line 5-5 in FIG. 1, showing the relationship between the height of each core material and the height of the aligning jig of the aligning device.
Figure 6:
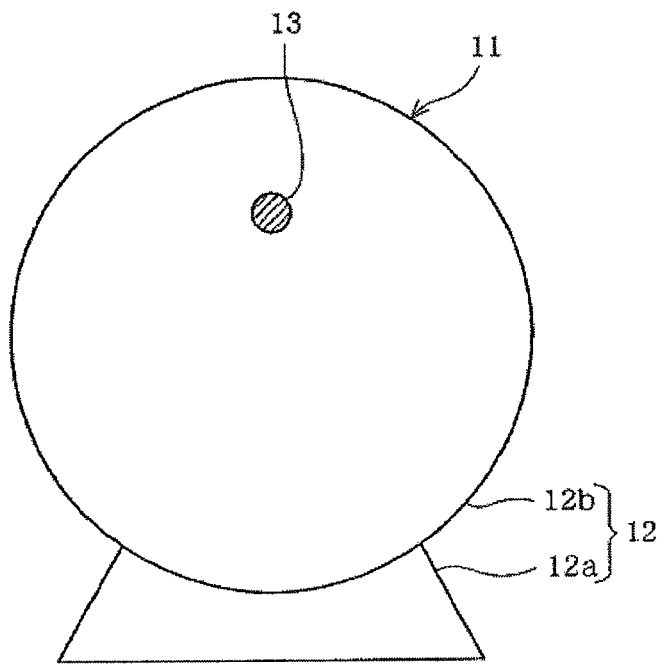
FIG. 6 is a sectional view taken along line 6-6 in FIG. 1.

An aligning apparatus 11 used in a manufacturing process of the above-described rotor core 1 will now be described with reference to FIGS. 1, 5 and 6. Referring to FIGS. 1 and 6, the aligning apparatus 11 includes a support 12 and an aligning jig 13. The support 12 includes a lower support 12*a* constituting a lower part thereof and an upper support 12*b* which is cylindrical in shape and is mounted on the lower support 12*a*. The upper support 12*b* is supported and fixed in position by the lower support 12*a*. The upper support 12*b* is formed into the shape of a cylindrical block. The upper support 12*b* may incorporate a vibrating member for vibrating the aligning jig 13, for example, an eccentric motor and gear. The aligning jig 13 is provided on apart of the upper support 12*b* near an upper end of the support 12*b* and extends forward from the support 12*b* or rightward as viewed in FIG. 1 into the shape of a bar. The aligning jig 13 has a larger lengthwise dimension or length than an axial dimension of the rotor core 1 and is to engage the catch recesses 7 and 8 which are continuous horizontally to the central axes of the rotor core blocks 2 and 3. The aligning jig 13 has a circular section and a diameter slightly smaller than the circumferential dimensions of the catch recesses 7 and 8. The aligning jig 13 is inserted into the catch recesses 7 and 8 of each of the first and second core materials 4*a* and 4*b* in parallel to the direction of sheet thickness of each of the first and second core materials 4*a* and 4*b* thereby to catch each of the first and second core materials 4*a* and 4*b*, as shown in FIGS. 1 and 5, for example, whereby the aligning jig 13 engages each of the first and second core materials 4*a* and 4*b*.

When inserted through the upper interior of the hole 5 of each of the core materials 4*a* and 4*b* whose catch recesses 7 are located in the upper part thereof, the aligning jig 13 is moved along the inner circumferential surface of the hole 5 of each of the first and second core materials 4*a* and 4*b* into the catch recess 7 located in the upper part of each of the first and second core materials 4*a* and 4*b*. When the aligning jig 13 is located in the catch recess 7, an upper thereof collides with the side surface 7*a* located radially outward with respect to the catch recess 7, whereby the catch recess 7 is caught by the aligning jig 13. Furthermore, when inserted into the upper interior of the hole 5 of the core material 4*a* whose catch recess 8 is located in the upper part thereof, the aligning jig 13 is moved into the catch recess 8. An upper part of the aligning jig 13 collides with the side surface 8*a* located radially outward with respect to the catch recess 8, whereby the catch recess 8 is caught by the aligning jig 13.

The radially outward dimension $L_1$ or the depth of the catch recess 7 differs from the radially outward dimension $L_2$ or the depth of the catch recess 8 in the above-described case. Accordingly, when the first or second core material 4*a* or 4*b* is caught by the aligning jig 13 which is located in the catch recess 7 or 8 thereof, the radially outward heights of the rotor core blocks 2 and 3 differ from each other by the difference between the axially outward dimensions of the catch recesses 7 and 8, $(L_2-L_1)$, as shown in FIGS. 1 and 5. Accordingly, the dimensions of rotor core blocks 2 and 3 in the stacking direction can be confirmed by catching the catch recesses 7 and 8 by the aligning jig 13 respectively. It can also be confirmed whether the first or second core material 4*a* or 4*b* is circumferentially shifted by a predetermined angle.

A method of manufacturing the rotor core 1 will now be described with reference to FIGS. 1 to 6. Firstly, in a core material forming step, a plurality of first and second core materials 4*a* and 4*b* as shown in FIGS. 3A, 3B, 4A and 4B is made by the use of a press machine (not shown). Next, in a block forming step, a plurality of, for example, five, first core materials 4*a* and five second core materials 4*b* are stacked so that the catch recesses of the same configuration in the direction of sheet thicknesses of the first and second core materials 4*a* and 4*b*, for example, the catch recesses 7 correspond with one another, whereby the rotor core blocks 2 and 3 are manufactured. The rotor core blocks 2 and 3 have the same configuration in the embodiment. Accordingly, the rotor core blocks 2 and 3 are manufactured without any distinction therebetween in the block forming step. A half of the manufactured rotor core block serves as the rotor core block 2 and the other half of the block serves the rotor core block 3.

Subsequently, in a stacking step, m number of, for example, two, rotor core blocks 2 and 3 are stacked together with the aligning jig 13 being inserted therethrough as shown in FIG. 1. In this case, the catch recesses 7 and 8 with the same configuration are caught for every rotor core block 2 or 3 while being relatively shifted circumferentially by (360÷m)° or 180°. More specifically, in the embodiment, the catch recess 7 of the rotor core block 2 is firstly caught by the aligning jig 13 while being located in the upper side. Next, the catch recess 8 of the rotor core block 3 is caught by the aligning jig 13 while being located in the upper side. In this case, another rotor core block 2 with the same configuration as the previously caught rotor core block 2 is circumferentially turned by 180° and then caught in the turned state by the aligning jig 13 to be stacked as the rotor core block 3 on the previously caught rotor core block 2. Alternatively, the rotor core block 2 with the same configuration as the previously caught rotor core block 2 is vertically reversed by 180° and then caught in the reversed state to be stacked as the rotor core block 3 on the previously caught rotor core block 2.

The aligning jig 13 is moved along the circumferential surface of the hole 5 to engage the nearby catch recesses 7 and even in a case where the catch recesses 7 and 8 are circumferentially displaced more or less relative to the aligning jig 13 when the catch recesses 7 and 8 of the first and second core materials 4a and 4b are caught by the aligning jig 13. Consequently, the rotor core blocks 2 and 3 are caught by the aligning jig 13 while being stacked so that the inner circumferential opening of the catch recess 7 of the rotor core block 2 corresponds with the inner circumferential opening of the catch recess 8 of the rotor core block 3 or vice versa. In this case, the radially outward dimensions or heights of the rotor core blocks, that is, upper radially outward heights of the core materials differ from each other, as described above. Furthermore, the dimensions of the rotor core blocks 2 and 3 in the stacking direction can be confirmed. When the dimension of the rotor core block 2 or 3 in the stacking direction differs from a predetermined dimension, it can be confirmed that the rotor core blocks 2 and 3 are not stacked while being shifted from each other circumferentially by $(360 \div m)°$. Furthermore, when outer circumferential surfaces of the rotor core blocks 2 and 3 have irregularity, it can be confirmed that the first and second core materials 4a and 4b are stacked while being shifted by a predetermined angle.

The aligning jig 13 is removed from the catch recesses 7 and 8 of the rotor core blocks 2 and 3 when there is no problem regarding the dimensions of the first and second core materials 4a and 4b in the stacking direction, the dimensions of the rotor core blocks 2 and 3 in the stacking direction, and the like. The rotor core blocks 2 and 3 are crimped together to be formed into the rotor core 1. It has been confirmed whether or not the first and second core materials 4a and 4b are stacked while each being circumferentially shifted by the predetermined angle. As a result, the rotor core 1 in which the first and second core materials 4a and 4b are stacked while each being shifted by the predetermined angle.

On the other hand, even when the first and second core materials 4a and 4b have not been stacked in the stacking step while each being shifted by the predetermined angle, the first and second core materials 4a and 4b are turned by a predetermined angle with the aligning jig 13 being inserted through the rotor core blocks 2 and 3 so as to assume the respective normal positions. Consequently, the rotor core blocks 2 and 3 can be obtained in which the first and second core materials 4a and 4b are circumferentially shifted by a predetermined angle.

Aluminum die-casting is then applied to the rotor core 1 so that a rotating shaft is provided in the through hole 5 by shrink fitting or the like, whereby a rotor (not shown) is obtained. A rotating electrical machine is obtained when a stator is disposed around the outer circumference of the rotor. In this case, the rotor core 1 and the rotating shaft may be fixed together by the use of a key and a key groove neither of which is shown.

The following advantageous effects can be achieved from the above-described embodiment. M number or two catch recesses 7 and 8 are formed in the inner circumferences of the first and second core materials 4a and 4b so as to be disposed circumferentially at the interval of $(360 \div m)°$ and so as to extend radially outward. The radially outward dimensions or heights of the rotor core blocks 2 and 3 from a reference floor surface are differentiated from each other depending upon whether or not the first and second core materials 4a and 4b have been caught in the catch recess 7 or 8. As a result, it can visually be confirmed whether or not the first and second core materials 4a and 4b are stacked while being shifted circumferentially by the predetermined angle, for example, 180° since m=2. This can provide easy confirmation as to whether or not the first and second core materials 4a and 4b are stacked circumferentially by the predetermined angle, whereupon the rotor core 1 insusceptible to influences of sheet thickness differences of the first and second core materials 4a and 4b can be obtained. Additionally, an amount of imbalance in the weight of the first and second core materials 4a and 4b can be reduced since the first and second core materials 4a and 4b are formed with the respective balance holes 9.

The aligning device 11 may be configured to vibrate the aligning jig 13. In this case, the aligning jig 13 is vibrated after the catch recesses 7 and 8 of the rotor core blocks 2 and 3 have been caught by the catching jig 13 respectively. Consequently, since the aligning jig 13 and each of the catch recesses 7 and 8 fully engage each other, it can more clearly be confirmed whether or not the radially outward heights of the first and second core materials 4a and 4b differ from each other.

Figure 7:
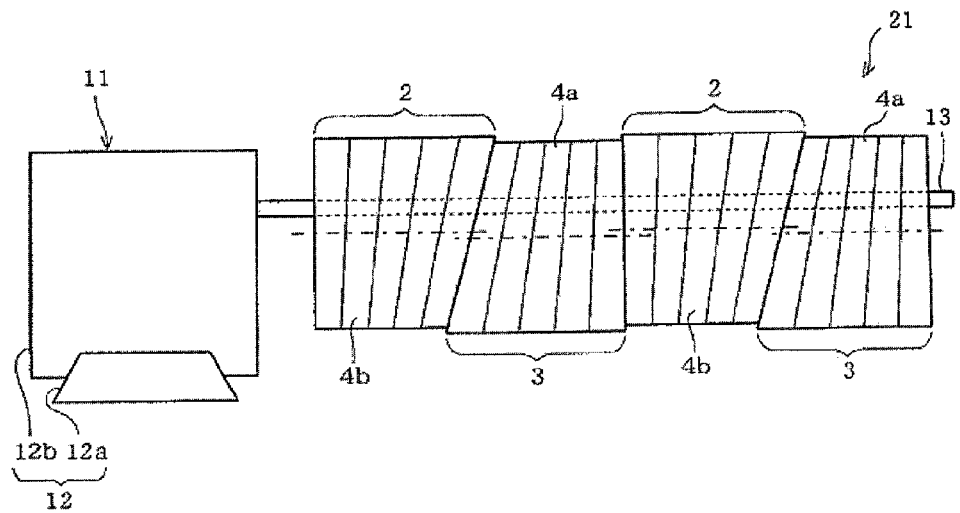
FIG. 7 is a view similar to FIG. 1, showing a second embodiment.
Figure 8:
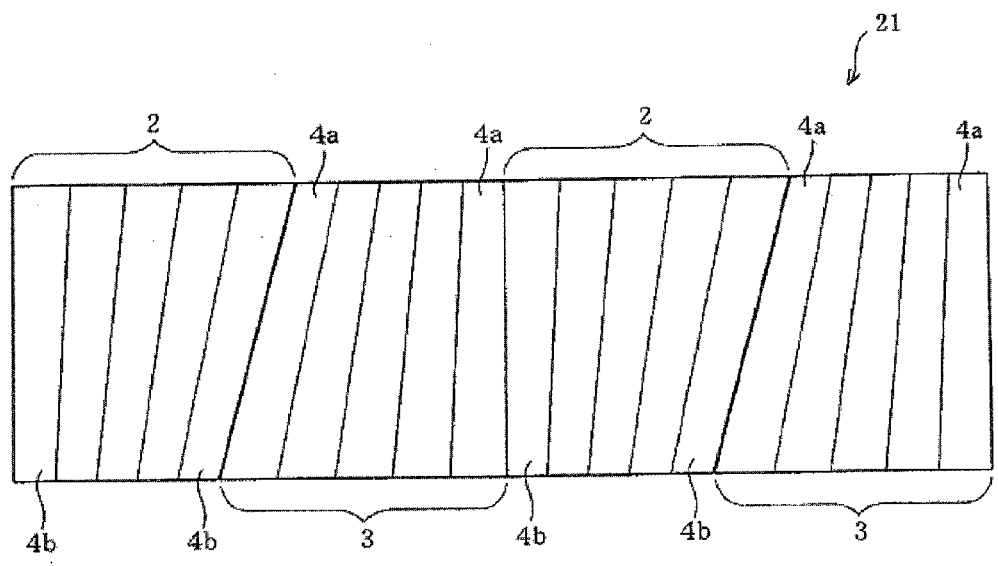
FIG. 8 is a view similar to FIG. 2, showing the second embodiment.

A second embodiment will be described with reference to FIGS. 7 and 8. The rotor core 21 of the second embodiment is constituted by a plurality of rotor core blocks 2 and a plurality of rotor core blocks 3, more specifically, two rotor core blocks 2 and two rotor core blocks 3 all of which are stacked on one another. The rotor core blocks 2 and 3 are stacked alternately in the stacking direction in the rotor core 21. Alternatively, two rotor core blocks 2 may be stacked in turn, and two rotor core blocks 3 may subsequently be stacked on the rotor core block 2 in turn. Furthermore, the aligning jig 13 to be used for the stacking of the rotor core blocks 2 and 3 into the rotor core 21 has a length that is set to be longer than the axial dimension of the rotor core 21.

In the method of manufacturing the rotor core 21, the catch recess 7 of the rotor core block 2, the catch recess 8 of the rotor core block 3, the catch recess 7 of the rotor core 2 and the catch recess 8 of the rotor core block 3 are caught by the aligning jig 13 in sequence. Thus, two rotor core blocks 2 and two rotor core blocks 3 are stacked alternately in sequence. In this case, the rotor core blocks 2 and 3 differ from each other in the radially outward height by the difference between the radially outward lengths of the catch recesses 7 and 8.

The second embodiment described above can achieve the same advantageous effects as the first embodiment. More specifically, the dimensions of the rotor core blocks 2 and 3 in the stacking direction can be confirmed, and furthermore, it can be confirmed whether or not the first and second core materials 4a and 4b are shifted by a predetermined angle.

Figure 9:
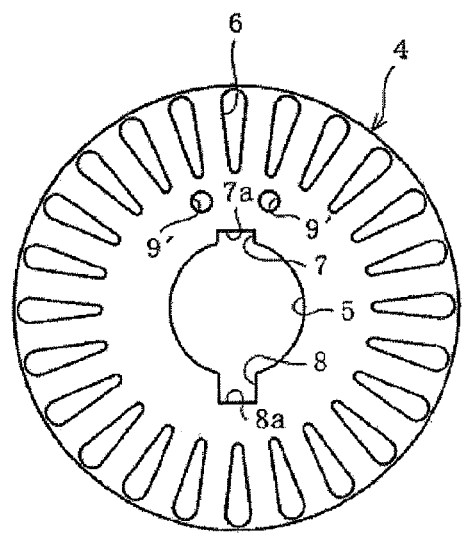
FIG. 9 is a schematic plan view of the core material of the rotor core in accordance with a third embodiment.

A third embodiment will now be described with reference to FIG. 9. The core material 4' as shown in FIG. 9 is formed with a plurality of, for example, two balance holes 9', instead of the balance holes 9 of the first and second core materials 4a and 4b. The balance holes 9' have respective sizes and positions both of which are set so that the gravity centers of the core materials 4' before and after the forming of the catch recesses 7 and 8 in the same manner as in the first embodiment. More specifically, each balance hole 9' occupies the position such that the sum of moments of all the catch recesses or the catch recesses 7 and 8 in this case becomes 0. In other words, each balance hole 9' is formed at a position such that:

(Mass of the core material corresponding to the cubic volume of the catch recess 7)×(distance from the central axis of the core material to the gravity center of the catch recess 7)+(mass of the core material corresponding to the cubic volume of balance hole 9')×(distance from the central axis of the core material to the gravity center of the balance hole 9')=(mass of the core material corresponding to the cubic volume of the catch recess 8)×(distance from the central axis of the core material to the gravity center of the catch recess 8), given that no catch recesses 7 and 8 and no balance hole 9' are formed.

A plurality of, for example, two balance holes 9' are formed in this case. Accordingly, the sum of moments of the balance holes 9' equals (mass of the core material corresponding to the cubic volume of balance hole 9')×(distance from the central axis of the core material to the gravity center of the balance hole 9').

According to the above-described third embodiment, imbalance of the weight of rotor core 1 with the forming of the catch recesses 7 and 8 can be reduced as in the first embodiment. Furthermore, as the result of the forming of a plurality of balance holes 9' instead of the balance holes 9, each balance hole 9' can be rendered smaller than the balance hole 9. Consequently, a sufficient distance can be ensured between the catch recess 8 and each balance hole 9', whereupon stress concentration caused between the catch recess 8 and each balance hole 9' can be reduced.

Figure 10:
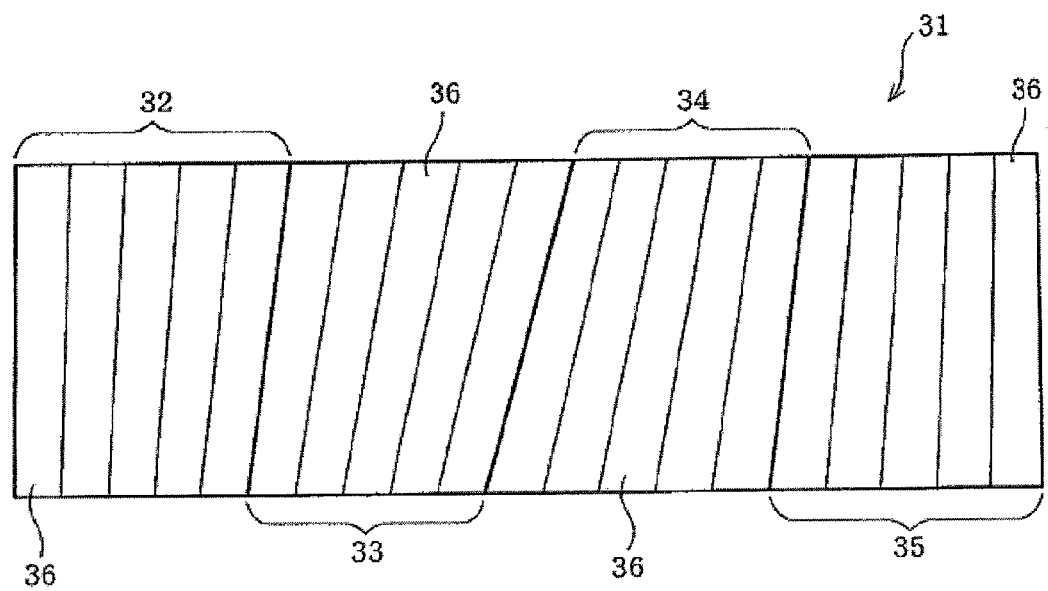
FIG. 10 is a view similar to FIG. 2, showing a fourth embodiment.

A fourth embodiment will be described with reference to FIGS. 10 to 12. The rotor core 31 of the fourth embodiment is constituted by a plurality of, for example, four rotor core blocks 32 to 35 which are stacked sequentially. The rotor core blocks 32 to 35 have the same configuration but are designated by different reference numerals for the sake of easiness in the explanation.

Figure 11:
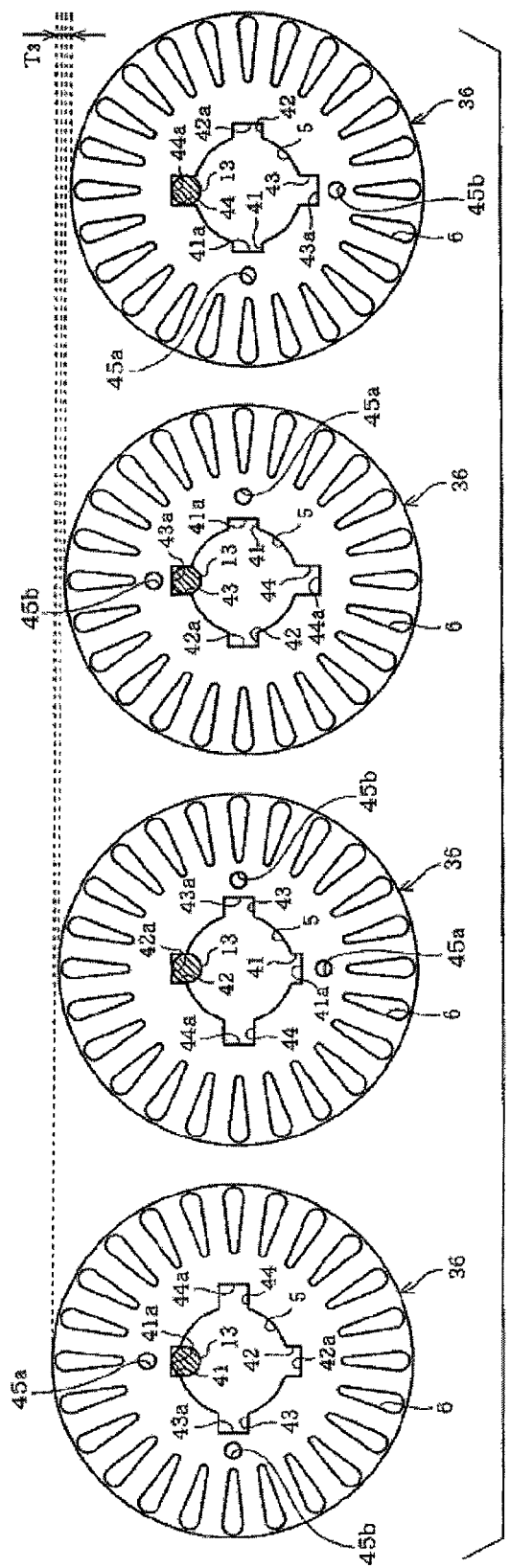
FIG. 11 is a schematic plan view of the core materials, showing the relationship between the height of each core material and the height of the aligning jig of the aligning device.

Each of the core blocks 32 to 35 is constituted by stacking a plurality of core materials 36 as shown in FIG. 11. The core material 36 has substantially the same configuration as the first and second core materials 4a and 4b in the first embodiment. The core material 36 is also formed with the through hole 5 and the slots 6. M number of, for example, four catch recesses 41-44 are formed in the inner circumferential surface of the hole 5. The catch recesses 41-44 are arranged circumferentially at intervals of (360÷m)° or 90° since m=4. More specifically, when the catch recess 41 is located above, the catch recesses 44, 42 and 43 are formed clockwise at intervals of 90°, as shown in FIG. 11. In other words, the catch recesses 41 and 42 are formed so as to occupy 180°-apart positions about the central axis of the annular core material 36 or circumferential opposite positions, respectively. The catch recesses 43 and 44 are also formed so as to occupy 180°-apart positions about the central axis of the annular core material 36 or circumferential opposite positions, respectively. The catch recesses 41-44 are concave cutouts extending radially outward with respect to the core material 36 from the inner circumferential surface of the hole 5.

The catch recesses 41 to 44 have radial dimensions or widths that are equal to one another as in the catch recesses 7 and 8 in the first embodiment. The catch recesses 41 to 44 further have radially outward dimensions or depths that differ from one another. More specifically, the depths of the catch recesses 41-44 are shortest dimensions from the inner circumferential surface of the core material 36 or a circumferential surface of an imaginary circle concentric with and having the same configuration as the through hole 5 to side surfaces 41a to 44a located radially outward with respect to the catch recesses 41-44 respectively. The depths of the catch recesses 41-44 differ from one another. Further more specifically, the catch recess 41 is the shallowest of the four, and the catch recess 42 is the second shallowest. The catch recess 43 is the third shallowest, and the catch recess 44 is the deepest of the four.

According to the above-described configuration, when the aligning jig 13 is inserted through an upper interior of the hole 5 in parallel to the direction of sheet thickness, a predetermined one of the catch recesses 41-44 can be caught by the aligning jig 13 as shown in FIG. 11. In this case, since the aligning jig 13 is located in the catch recess 41 of the core material 36, an upper part of the aligning jig 13 abuts onto a radially outward side surface 41a of the catch recess 41, whereby the core material 36 is caught by the aligning jig 13. Furthermore, when the aligning jig 13 is located in the catch recess 42 of the core material 36, an upper part of the aligning jig 13 abuts onto a radially outward side surface 42a of the catch recess 42, whereby the core material 36 is caught by the aligning jig 13. Furthermore, when the aligning jig 13 is located in the catch recess 43 of the core material 36, an upper part of the aligning jig 13 abuts onto a radially outward side surface 43a of the catch recess 43, whereby the core material 36 is caught by the aligning jig 13. Still furthermore, when the aligning jig 13 is located in the catch recess 44 of the core material 36, an upper part of the aligning jig 13 abuts onto a radially outward side surface 44a of the catch recess 44, whereby the core material 36 is caught by the aligning jig 13.

The catch recesses 41-44 have different depths in this case. Accordingly, when the catch recesses 41-44 of the core material 36 have been caught by the aligning jig 13, the radially outward dimensions or heights of the rotor core blocks 32-35 or the heights from a reference floor surface to the upper radially outward part of the core material 36 differ from one another by the differences of the depths of the catch recesses 41-44. Accordingly, when the aligning jig 13 is caught by the catch recesses 41-44 of the rotor core blocks 32-35, the heights of the radially outward parts of the rotor core blocks 32-35 are differentiated. This can realize confirmation of the dimensions of the rotor core blocks 32-35 in the stacking direction and confirmation as to whether or not the core materials 36 are shifted circumferentially by a predetermined angle.

According to the fourth embodiment, the aligning jig 13 is located in the shallow catch recess 41 in the case of the rotor core block 32 as shown in FIG. 11. Accordingly, the radially outward part of the core material 36 is located highest of the four rotor core blocks. Furthermore, since the aligning jig 13 is located in the catch recess 42 in the case of the rotor core block 33, the radially outward part of the core material 36 is located lower than the rotor core block 32. Since the aligning jig 13 is located in the catch recess 43 in the case of the rotor core block 34, the radially outward part of the core material 36 is located lower than the rotor core block 33. Furthermore, since the aligning jig 13 is located in the catch recess 44 in the case of the rotor core block 35, the radially outward part of the core material 36 is located lowest of the four rotor core blocks. In FIGS. 11 and 12, reference symbol "$T_3$" designates the difference between the heights of the core materials 36 in which the aligning jigs 13 are caught in the catch recesses 41 and 44 respectively. Furthermore, each core material 36 is formed with the balance holes 45a and 45b each having the same function as in the first and third embodiments. One or three or more balance holes may be provided in each core material 36, instead.

The balance hole 45a has a size and a position both of which are set so that the gravity center is the same before and after the forming of the catch recesses 41 and 42. More specifically, the balance hole 45*a* occupies the position such that the sum of moment of the catch recess 41 and moment of the catch recess 42 located opposite the catch recess 41 is zero. In other words, each balance hole 45*a* is formed at a position such that:

(Mass of the core material corresponding to the cubic volume of the catch recess 41)×(distance from the central axis of the core material to the gravity center of the catch recess 41)+(mass of the core material corresponding to the cubic volume of balance hole 45*a*)×(distance from the central axis of the core material to the gravity center of the balance hole 45*a*)=(mass of the core material corresponding to the cubic volume of the catch recess 42)×(distance from the central axis of the core material to the gravity center of the catch recess 42), given that no catch recesses 41 and 42 and no balance hole 45*a* are formed.

The balance hole 45*b* has a size and a position both of which are set so that the gravity center remains unchanged before and after the forming of the catch recesses 43 and 44. More specifically, the balance hole 45*b* occupies the position such that the sum of moment of the catch recess 43 and moment of the catch recess 44 located opposite the catch recess 43 is zero. In other words, each balance hole 45*b* is formed at a position such that:

(Mass of the core material corresponding to the cubic volume of the catch recess 43)×(distance from the central axis of the core material to the gravity center of the catch recess 43)+(mass of the core material corresponding to the cubic volume of balance hole 45*b*)×(distance from the central axis of the core material to the gravity center of the balance hole 45*b*)=(mass of the core material corresponding to the cubic volume of the catch recess 44)×(distance from the central axis of the core material to the gravity center of the catch recess 44), given that no catch recesses 43 and 44 and no balance hole 45*b* are formed.

The method of manufacturing the rotor core 31 will now be described with reference to FIGS. 10 to 12. Firstly, in the core material making step, a plurality of the core materials 36 as shown in FIG. 11 is punched out using a press machine although the step is not shown.

Next, in the block forming step, a plurality of, for example, five core materials 36 are stacked so that the catch recesses having the same configuration, for example, the catch recesses 41 to 44 correspond with one another, although the process is not shown. As a result, the rotor core blocks 32 to 35 are formed. Since the rotor core blocks 32 to 35 have the same configuration in the fourth embodiment, the rotor core blocks 32 to 35 are formed without any distinction in the block forming step. The formed rotor core blocks are equally divided into four sets, which serve as the rotor core blocks 32 to 35 respectively.

Figure 12:
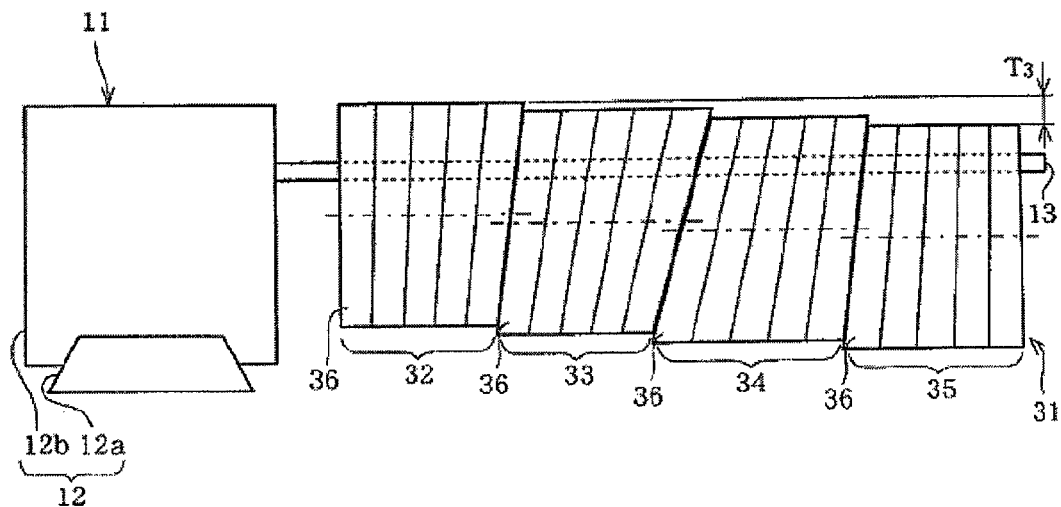
FIG. 12 is a view similar to FIG. 1, showing the fourth embodiment.

In the stacking step, m number of or four rotor core blocks 32 to 35 are stacked with the aligning jig 13 of the aligning device 11 being inserted through the stacked blocks, as shown in FIGS. 11 and 12. In this case, the catch recesses 41-44 are caught by the aligning jig 13 while being shifted for every rotor core block circumferentially by (360÷m)° or by 90° relative to one another. More specifically, firstly, the catch recess 41 of the rotor core block 32 is caught by the aligning jig 13 while the catch recess 41 is located above and the catch recess 44 is located rightward. Next, the rotor core block 33 is obtained by shifting the rotor core block 32 circumferentially by 180°, so that the catch recess 42 is caught by the aligning jig 13 while the catch recess 42 is located above and the catch recess 43 is located rightward. Next, the rotor core block 34 is obtained by shifting the rotor core block 32 clockwise by 90°, so that the catch recess 43 is caught by the aligning jig 13 while the catch recess 43 is located above and the catch recess 41 is located rightward. Finally, the rotor core block 35 is obtained by shifting the rotor core block 32 counter-clockwise by 90°, so that the catch recess 44 is caught by the aligning jig 13 while the catch recess 44 is located above and the catch recess 42 is located rightward.

Consequently, the rotor core blocks 32 to 35 are stacked on one another sequentially so that the inner circumferential openings of the catch recesses 41 to 43 of the rotor core blocks 32 to 34 and the inner circumferential opening of the rotor core block 35 circumferentially correspond with one another. In this case, the radially outward dimensions or heights of the rotor core blocks 32-35 or the heights from a reference floor surface to the upper radially outward part of the core material 36 differ from one another by the differences of the depths of the catch recesses 41-44, as described above. Accordingly, the dimensions of rotor core blocks 32-35 in the stacking direction can be confirmed. When the dimensions of the rotor core blocks 32-35 caught by the aligning jig 13 differ from one another, it is confirmed that the rotor core blocks 32-35 are not stacked on one another while being shifted from one another circumferentially by (360÷m)° or by 90° in this case.

The aligning jig 13 is detached from the rotor core blocks 32-35 after the stacking step, and the rotor core blocks 32-35 are crimped together, whereby the rotor core 31 is obtained.

The fourth embodiment as described above can achieve the following advantageous effects. M number of or four catch recesses 41-44 are formed so as to be disposed circumferentially at intervals of (360÷m)° so as to extend radially outward. The catch recesses 41-44 have different depths. The radially outward parts of the rotor core blocks 32-35 caught by the aligning jig 13 have the depths differing from one another depending upon which one of the catch recesses 41-44 is caught by the aligning jig 13. Consequently, it can be confirmed whether or not the core materials 36 are stacked while being shifted circumferentially by a predetermined angle, for example, 90° since m=4. This can provide the rotor core 31 in which the core materials 36 are stacked while being shifted circumferentially by the predetermined angle and which is unsusceptible to influences of sheet thickness deviation.

Figure 13:
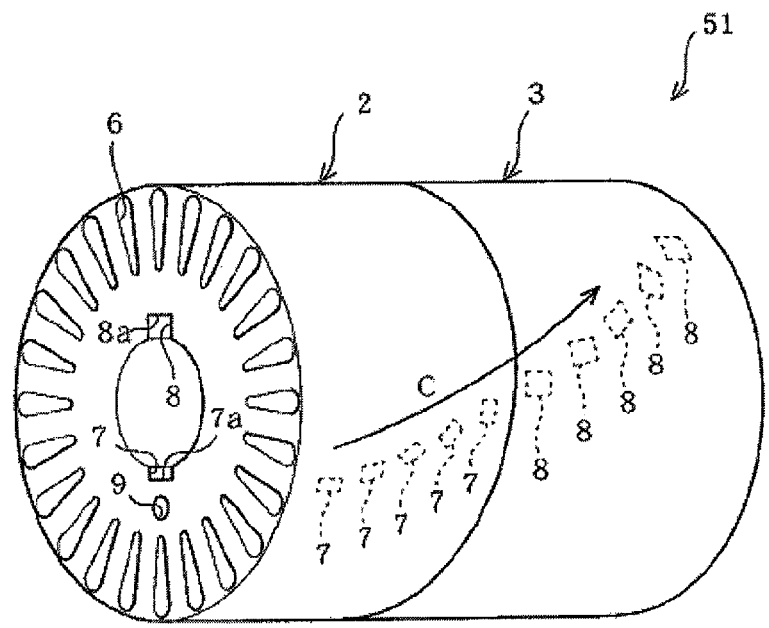
FIG. 13 is a schematic perspective view of the rotor core in accordance with a fifth embodiment.

A fifth embodiment will be described with reference to FIG. 13. The rotor core 51 as shown in FIG. 13 is obtained by skewing the slots 6 of the rotor core 1 of the first embodiment, for example, so that the slots 6 extend in a helical manner. The rotor core 51 is constituted by rotor core blocks 2 and 3.

A skew rod (not shown) is used to skew the slots 6. The skew rod extends in a helical manner axially with respect to the rotor core 51 so that the slots 6 of the rotor core 51 are skewed. The skew rod has a section which is vertical to its lengthwise direction and corresponds in shape with the catch recess 7 as viewed from axially outside of the core material 4.

The rotor core 51 is obtained by executing a skewing step subsequent to the first stacking step in the manufacturing process as shown in the first embodiment. More specifically, the aligning jig is detached from the catch recesses 7 and 8, and the skew rod is caused to engage the continuous catch recesses 7 and 8 in the stacking order of the rotor core blocks 2 and 3. More specifically, the catch recesses 7 and 8 which have been engaged with the aligning jig 13 axially continuously are now stacked on each other while being engaged with the skew rod, whereby the core materials 4 adjacent to one another in the direction of sheet thickness are stacked while being relatively shifted circumferentially. Consequently, the slots 6 are caused to extend obliquely thereby to be skewed. Thus, the skewed rotor core 51 is obtained, that is, the slots 6 and the catch recesses 7 and 8 extend helically in the same direction. Arrow C in FIG. 13 designates a helical direction of the continuous catch recesses 7 and 8.

According to the fifth embodiment, the skewed rotor core 51 can be obtained. Furthermore, the catch recesses 7 and 8 have different depths. Accordingly, when the rotor core blocks 2 and 3 are engaged with the skew rod which is designed to engage the shallower catch recess 7, the skew rod is inserted into the catch recess 7 while a side surface 7*a* of the catch recess 7 is in abutment with the skew rod. Thus, the slots 6 of the rotor core 51 can easily be skewed. Additionally, the outer circumference of the rotor core 51 may be held by a cylindrical member during skewing, so that radial displacement of the rotor core 51 is further limited.

According to at least one of the above-described embodiments, the m number of catch recesses are formed so as to be circumferentially arranged at intervals of (360÷m)° and so as to extend radially outward, and the catch recesses have different depths. Consequently, it can be confirmed, by visual observation or another manner, whether or not the core materials are stacked while being shifted circumferentially by the predetermined angle.

According to the above-described method of manufacturing the rotor core, the rotor core can be obtained which permits visual confirmation or another manner as to whether or not the core materials are stacked while being shifted circumferentially by the predetermined angle.

The number of rotor core blocks is 2 (m=2) or 4 (m=4) in the foregoing embodiments. However, when the sheet thickness of the rotor core has no deviation after the stacking, the above-described embodiments may be applied to the case where the number of rotor core blocks is 3 (m=3) or 5 (m=5) or more. The sequence of rotor core blocks to be stacked may be changeable.

The number of balance holes should not be limited to 1 or 2 but may be 3 or more. Furthermore, a single balance hole may be provided in the fifth embodiment.

The slots of the rotor core are filled with aluminum in the foregoing embodiments. However, permanent magnets may be enclosed in the slots of the rotor core respectively, instead.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A rotor core comprising:
   a plurality of rotor core blocks each of which is constituted by stacking annular sheet-like core materials in a direction of sheet thickness of each core material;
   a plurality of catch recesses which are circumferentially disposed in an inner circumference of each core material at an interval of a predetermined angle so as to extend radially outward, the catch recesses having respective circumferential dimensions equal to each other different radial depths,
   wherein in each rotor core block, a plurality of the core materials is stacked while the catch recesses having an identical configuration are aligned; and
   wherein the core rotor blocks have respective outer peripheries which are shifted from each other according to the depths of the catch recesses caught by a bar-shaped aligning jig when the catch recesses of the rotor core blocks are caught by the aligning jig.

* * * * *